United States Patent
Park et al.

(10) Patent No.: US 7,459,809 B2
(45) Date of Patent: Dec. 2, 2008

(54) X-Y STAGE DRIVER HAVING LOCKING DEVICE AND DATA STORAGE SYSTEM HAVING THE X-Y STAGE DRIVER

(75) Inventors: Hong-sik Park, Seoul (KR); Jong-youp Shim, Incheon-si (KR); Seung-bum Hong, Seongnam-si (KR); Dong-ki Min, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 80 days.

(21) Appl. No.: 11/582,336

(22) Filed: Oct. 18, 2006

(65) Prior Publication Data

US 2007/0188199 A1    Aug. 16, 2007

(30) Foreign Application Priority Data

Feb. 15, 2006    (KR) ............... 10-2006-0014696

(51) Int. Cl.
*H02K 41/00*    (2006.01)

(52) U.S. Cl. .......................... 310/12; 310/15

(58) Field of Classification Search ........... 310/12, 310/13, 15
See application file for complete search history.

(56) References Cited

U.S. PATENT DOCUMENTS

| | | | |
|---|---|---|---|
| 6,992,407 B2 * | 1/2006 | Kano et al. | 310/10 |
| 7,133,115 B2 * | 11/2006 | Nawata et al. | 355/53 |
| 7,333,180 B2 * | 2/2008 | Tanaka | 355/72 |

* cited by examiner

*Primary Examiner*—Darren Schuberg
*Assistant Examiner*—Iraj A Mohandesi
(74) *Attorney, Agent, or Firm*—Sughrue Mion, PLLC (57) ABSTRACT

An X-Y stage driver having a locking device and a data storage system having the X-Y stage driver. The X-Y stage driver includes an X-Y stage; a supporting unit that supports the X-Y stage and has elastic beams that support corners of the X-Y stage; a driving unit that drives the X-Y stage in a first direction and a second direction which is perpendicular to the first direction; a stiffener that prevents the X-Y stage from rotating; and a locking device that fixes the stiffener by an electrostatic force.

9 Claims, 7 Drawing Sheets

X-Y STAGE DRIVER HAVING LOCKING DEVICE AND DATA STORAGE SYSTEM HAVING THE X-Y STAGE DRIVER

CROSS-REFERENCE TO RELATED PATENT APPLICATION

This application claims priority from Korean Patent Application No. 10-2006-0014696, filed on Feb. 15, 2006, in the Korean Intellectual Property Office, the disclosure of which is incorporated herein in its entirety by reference.

BACKGROUND OF THE INVENTION

1. Field of the Invention

The present invention relates to an X-Y stage driver having a locking device and a data storage system having the X-Y stage driver, and more particularly, to an X-Y stage driver having a locking device that prevents the X-Y stage from moving in a different direction while the X-Y stage is moving in a predetermined direction, and a data storage system having the X-Y stage driver.

2. Description of the Related Art

Magnetic devices that use a micro electro-mechanical system (MEMS) technique have been recently developed. Such magnetic devices include magnetic compasses, electromagnetic scanners, and electromagnetic valves. Research on the development of MEMS type data storage systems that use a scanning probe microscope (SPM) technique has been actively conducted.

Such data storage systems record or read data on a medium by moving an X-Y stage whereon the medium is placed in a two-dimensional plane while a plurality of probes are fixed to the data storage system. To record or read high density data, the location of the X-Y stage having the medium must be precisely controlled with respect to the probes. Particularly, the X-Y stage must be prevented from moving in a different direction while moving in a predetermined direction.

SUMMARY OF THE INVENTION

The present invention provides an X-Y stage driver having a locking device that may prevent the X-Y stage from moving in a different direction while the X-Y stage is moving in a predetermined direction.

The present invention also provides a data storage system that includes the X-Y stage driver having the locking device.

According to an aspect of the present invention, there is provided an X-Y stage driver having a locking device, the X-Y stage comprising: an X-Y stage; a supporting unit that supports the X-Y stage and has elastic beams that support corners of the X-Y stage; a driving unit that drives the X-Y stage in a first direction and a second direction which is perpendicular to the first direction; a stiffener that prevents the X-Y stage from rotating; and a locking device that fixes the stiffener by an electrostatic force.

The locking device may comprise: a first anchor disposed to face a side surface of the stiffener; a plurality of first comb electrodes formed on a surface of the stiffener facing the first anchor; and a plurality of second comb electrodes alternately disposed with the first comb electrodes on the first anchor.

The second comb electrode corresponding to the first comb electrode may be a pair of electrodes respectively formed on both sides of the first comb electrode.

The first comb electrode may have a width greater than a width of the second comb electrode.

The supporting unit may comprise a second anchor that supports the elastic beams and a base that contacts a lower surface of the second anchor, wherein the first anchor may be formed on the base.

The driving unit may comprise a plurality of coils formed on the X-Y stage and permanent magnets disposed over and under the coils and form a magnetic field around the coils.

According to another aspect of the present invention, there is provided a data storage system comprising: an X-Y stage driver having a locking device; a medium mounted on the X-Y stage; and a probe array fixedly disposed above the medium to read or record data in each cell of the medium.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

An X-Y stage driver having a locking device according to exemplary embodiments of the present invention and a data storage system will now be described in detail with reference to the accompanying drawings.

Figure 1:
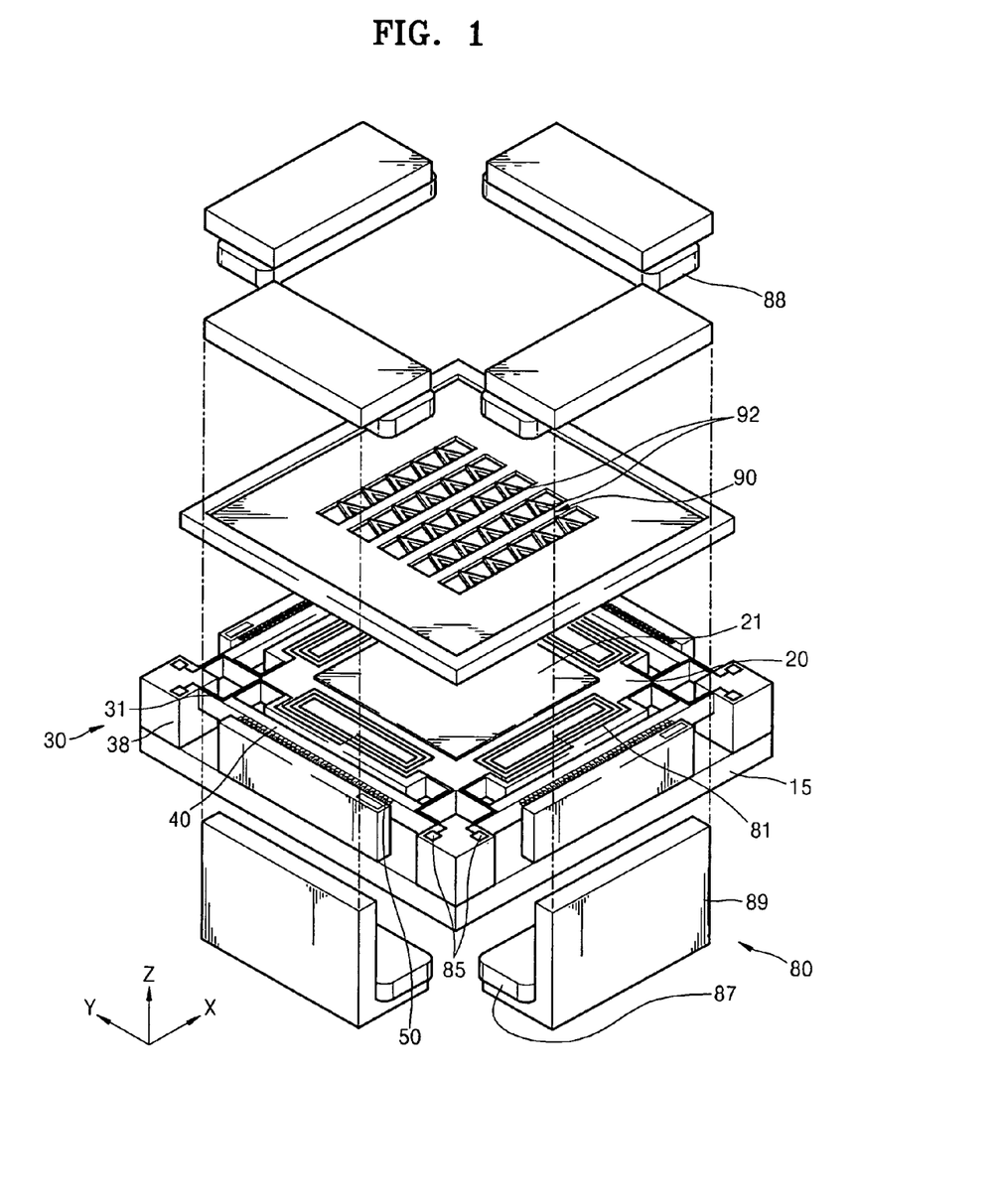
FIG. 1 is a schematic exploded perspective view of a data storage system according to an exemplary embodiment of the present invention.
Figure 2:
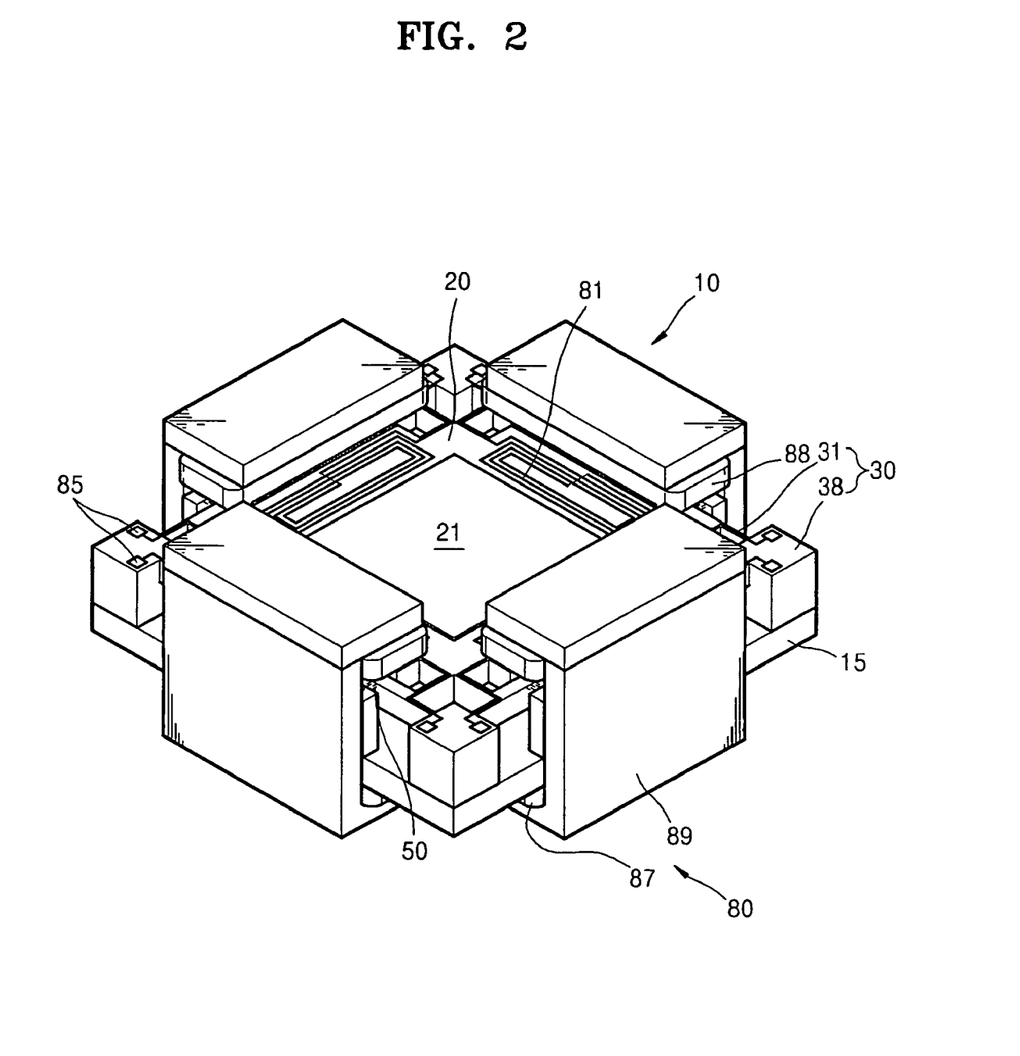
FIG. 2 is a schematic perspective view of the data storage system of FIG. 1.
Figure 3:
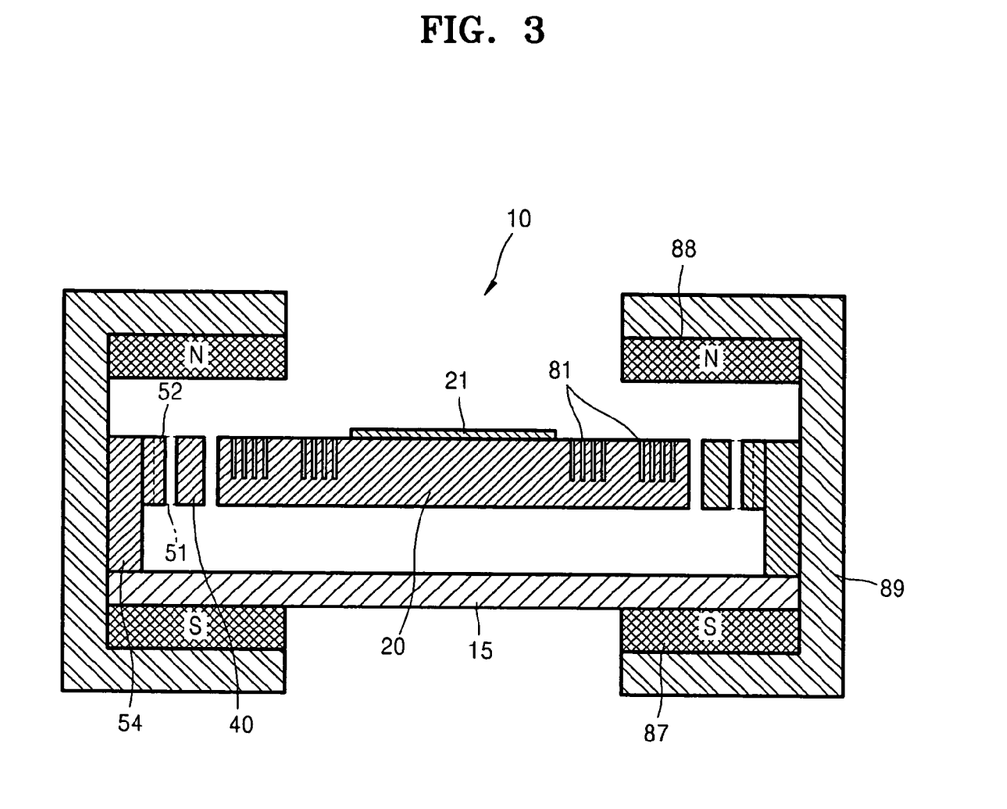
FIG. 3 is a cross-sectional view of the data storage system of FIG. 1.

FIG. 1 is a schematic exploded perspective view of a data storage system according to an exemplary embodiment of the present invention. FIGS. 2 and 3 respectively are a schematic perspective and a cross-sectional view of the data storage system of FIG. 1.

Referring to FIGS. 1 through 3, the data storage system includes an X-Y stage driver 10 on which a medium 21 that records data is mounted and a probe array 90 fixedly disposed above the medium 21. In FIGS. 2 and 3, the probe array 90 is omitted.

The X-Y stage driver 10 includes a base 15, an X-Y stage 20 whereon the medium 21 is mounted, a supporting unit 30 that maintains the X-Y stage 20 at a predetermined distance from the base 15 and elastically supports the X-Y stage 20, stiffeners 40 that prevent the X-Y stage 20 from rotating, a locking device 50 that prevents the X-Y stage 20 from moving along one axis while being driven along another axis, and an electromagnetic driver 80 that drives the X-Y stage 20 along two axes.

Although the present exemplary embodiment illustrates the data storage system as having the X-Y stage 20 on which the medium 21 is mounted, it will be appreciated that the present invention is not limited thereto. For example, the X-Y stage driver 10 can be applied to any system for analyzing a sample placed on the X-Y stage 20 through the probe array 90.

The probe array 90 includes micro tips (not shown) formed on a lower surface of a cantilever 92, and data stored in each cell (data storing unit) of the medium 21 is recorded or read using the micro tips.

As the X-Y stage 20 moves horizontally, the relative positions of the cells of the medium 21 are changed, and thus, data can be read or recorded through the micro tips of the probe array 90. For this purpose, the electromagnetic driver 80 is provided to horizontally move the X-Y stage 20 in two directions on the base 15, that is, in a first direction (x direction) and in a second direction (y direction) perpendicular to the first direction.

The electromagnetic driver 80 includes a plurality of flat panel coils 81 provided on the X-Y stage 20, a plurality of permanent magnets 87 disposed under the X-Y stage 20 corresponding to the flat panel coils 81, a plurality of permanent magnets 88 disposed over the X-Y stage 20 corresponding to the flat panel coils 81, and yokes 89 for constituting a closed loop magnetic circuit together with the permanent magnets 87 and 88. Reference numeral 85 indicates a driving electrode pad for supplying a current to the flat panel coils 81.

As depicted in FIGS. 1 and 2, the flat panel coils 81 can be formed on an upper part of the X-Y stage 20, but the present invention is not limited thereto. For example, the flat panel coils 81 can be formed on a lower part of the X-Y stage 20 or can be formed through the X-Y stage 20.

In the present exemplary embodiment, the X-Y stage 20 has a rectangular shape, and four flat panel coils 81 are disposed near each of the sides thereof. The permanent magnets 87 and 88 have different polarities and are respectively installed under and over each of the four flat panel coils 81. The X-Y stage 20 moves in the X-Y plane according to an electromagnetic force generated when a current flows in the flat panel coils 81.

Figure 4:
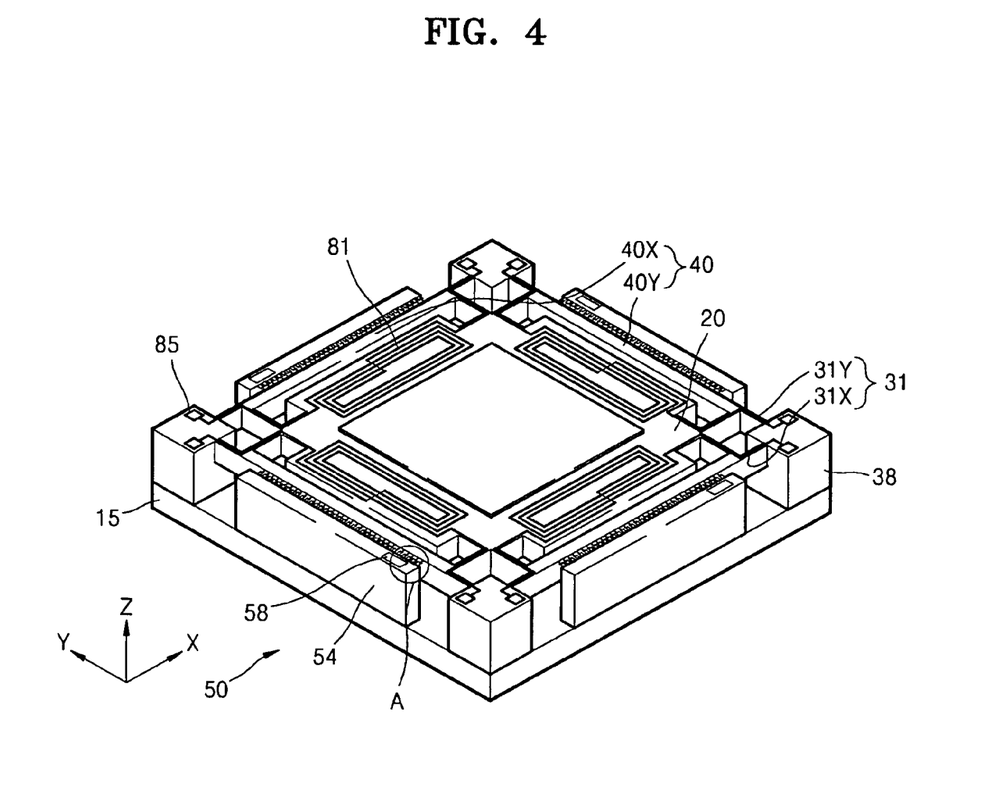
FIG. 4 is a partial perspective view of an X-Y stage driver employed in the data storage system of FIG. 1.
Figure 5:
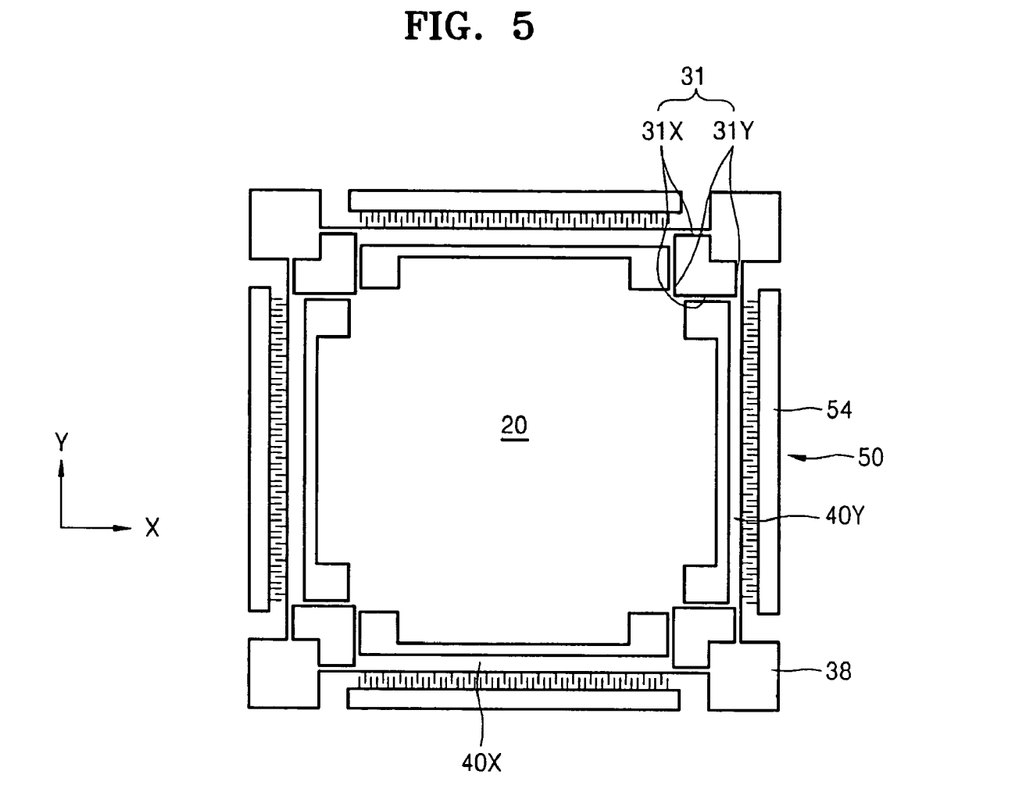
FIG. 5 is a plan view of the X-Y stage driver of FIG. 4.

FIG. 4 is a partial perspective view of the X-Y stage driver 10 employed in the data storage system of FIG. 1. FIG. 5 is a plan view of the X-Y stage driver 10 of FIG. 4.

Referring to FIGS. 4 and 5, the supporting unit 30 includes elastic beams 31 provided on corner portions of the X-Y stage 20 and a second anchor 38 that supports the elastic beams 31 and is installed on the base 15. The elastic beams 31 may deform a small amount in a vertical direction and a larger amount in a horizontal direction.

The elastic beams 31 include an x-direction portion 31x and a y-direction portion 31y. The x-direction portion 31x deforms in the y direction, and the y-direction portion 31y deforms in the x direction. The X-Y stage 20 moves in the X-Y direction according to bending of the elastic beams 31.

The stiffeners 40 are disposed parallel to each of the sides of the X-Y stage 20 and a predetermined distance therefrom. The elastic beams 31 are connected to both ends of the stiffeners 40 to prevent the X-Y stage 20 from rotating when the X-Y stage 20 moves horizontally. For this purpose, the stiffeners 40 include an x-direction portion 40x parallel to the x direction and a y-direction portion 40y parallel to the y direction. End portions of the stiffeners 40 are respectively connected to the x-direction portion 31x and the y-direction portion 31y of the elastic beams 31.

Figure 6:
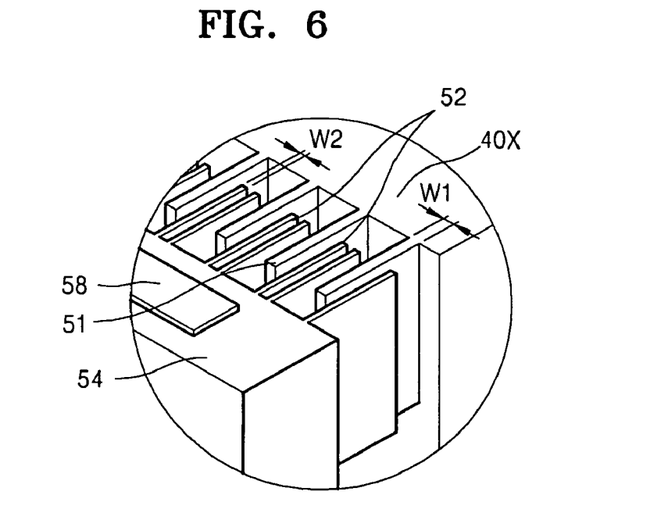
FIG. 6 is an enlarged view of portion of A in FIG. 4.

With additional reference to FIG. 6, the locking device 50 includes a first anchor 54 facing the respective stiffeners 40 on the base 15, first comb electrodes 51 formed on a surface of the respective stiffeners 40 facing the first anchor 54, and second comb electrodes 52 formed on the first anchor 54 so as to be alternately installed with the first comb electrodes 51.

The second comb electrodes 52 include pairs of electrodes provided on both sides of each of the first comb electrodes 51, such that the pairs of the second comb electrodes 52 straddle each of the first comb electrodes 51. The first comb electrodes 51 are disposed in the center between the corresponding second comb electrodes 52. The individual first comb electrodes 51 may have a width W1 greater than a width W2 of the individual second comb electrodes 52.

In the present exemplary embodiment, the second comb electrodes 52 are respectively formed on both sides of the first comb electrode 51, but the present invention is not limited thereto. That is, a pair of the first comb electrodes 51 corresponding to the second comb electrodes 52 can be formed on both sides of the second comb electrodes 52, and the second comb electrodes 52 may have a width greater than the width of the first comb electrodes 51.

The elements on the base 15, that is, the first anchor 54, the second anchor 38, the X-Y stage 20, and the elastic beams 31 may be formed of a conductive material, for example, a single crystalline silicon. The base 15 can be formed of a material having high electrical insulating capability, such as a glass substrate.

An electrode pad 58 is formed on the first anchor 54, and the electrode pad 58 is electrically connected to an external area using wire bonding.

An operation of the X-Y stage driver 10 having the locking device 50 according to an exemplary embodiment of the present invention will now be described in detail with reference to the accompanying drawings.

Figure 7:
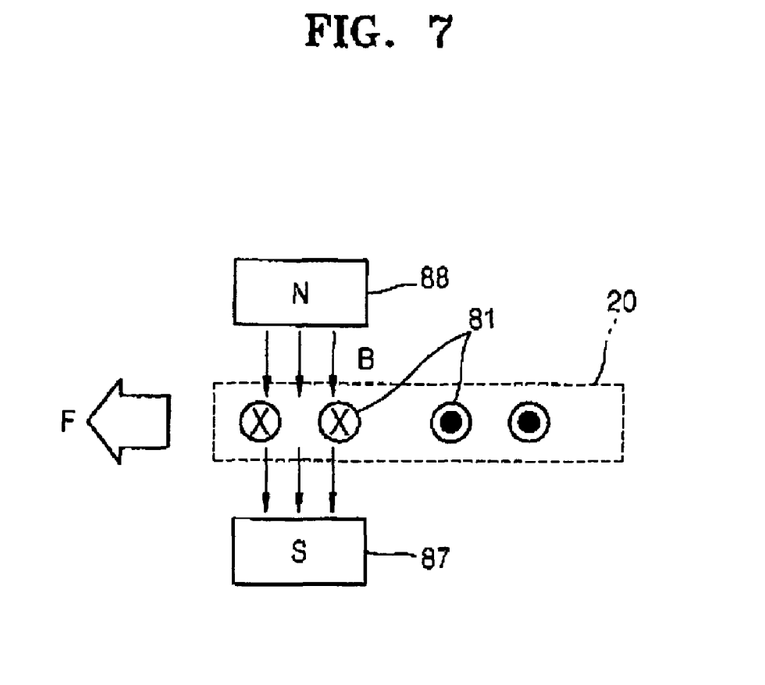
FIG. 7 is a schematic drawing for showing the principle of driving an X-Y stage driver according to an exemplary embodiment of the present invention.

FIG. 7 is a schematic drawing showing a principle of driving the X-Y stage driver 10 according to an exemplary embodiment of the present invention. The pair of the permanent magnets 87 and 88 have different polarities and are installed to face each other, and a portion of the flat panel coils 81 formed on the X-Y stage 20 is disposed therebetween. A magnetic field B is formed in a space between the two permanent magnets 87 and 88. When a portion of the flat panel coils 81, through which current flows, is placed in the space, the X-Y stage 20, on which the flat panel coils 81 are formed, receives a force F in a perpendicular direction to both the magnetic field direction and the current flow direction.

Figure 8:
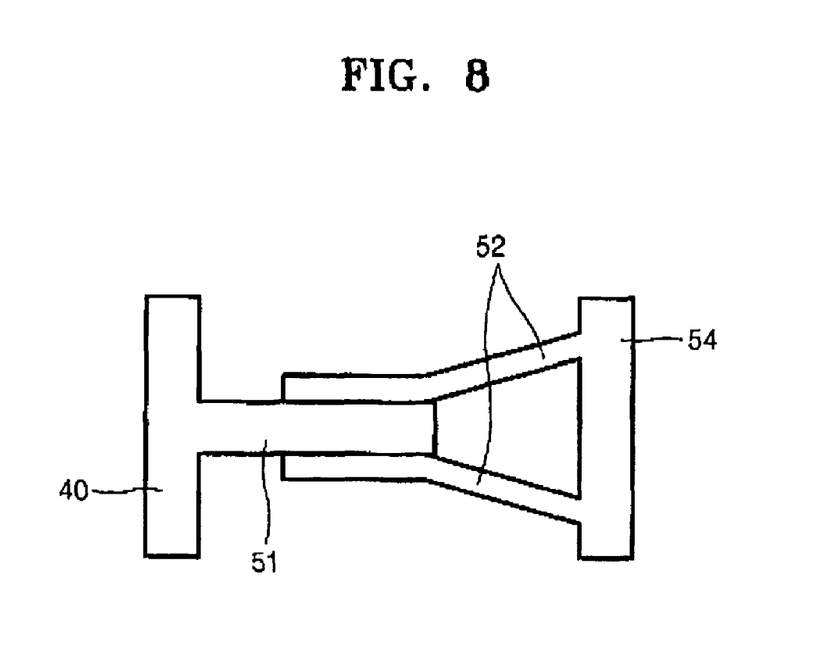
FIGS. 8 and 9 are plan views for explaining an operation of a locking device according to an exemplary embodiment of the present invention.
Figure 9:
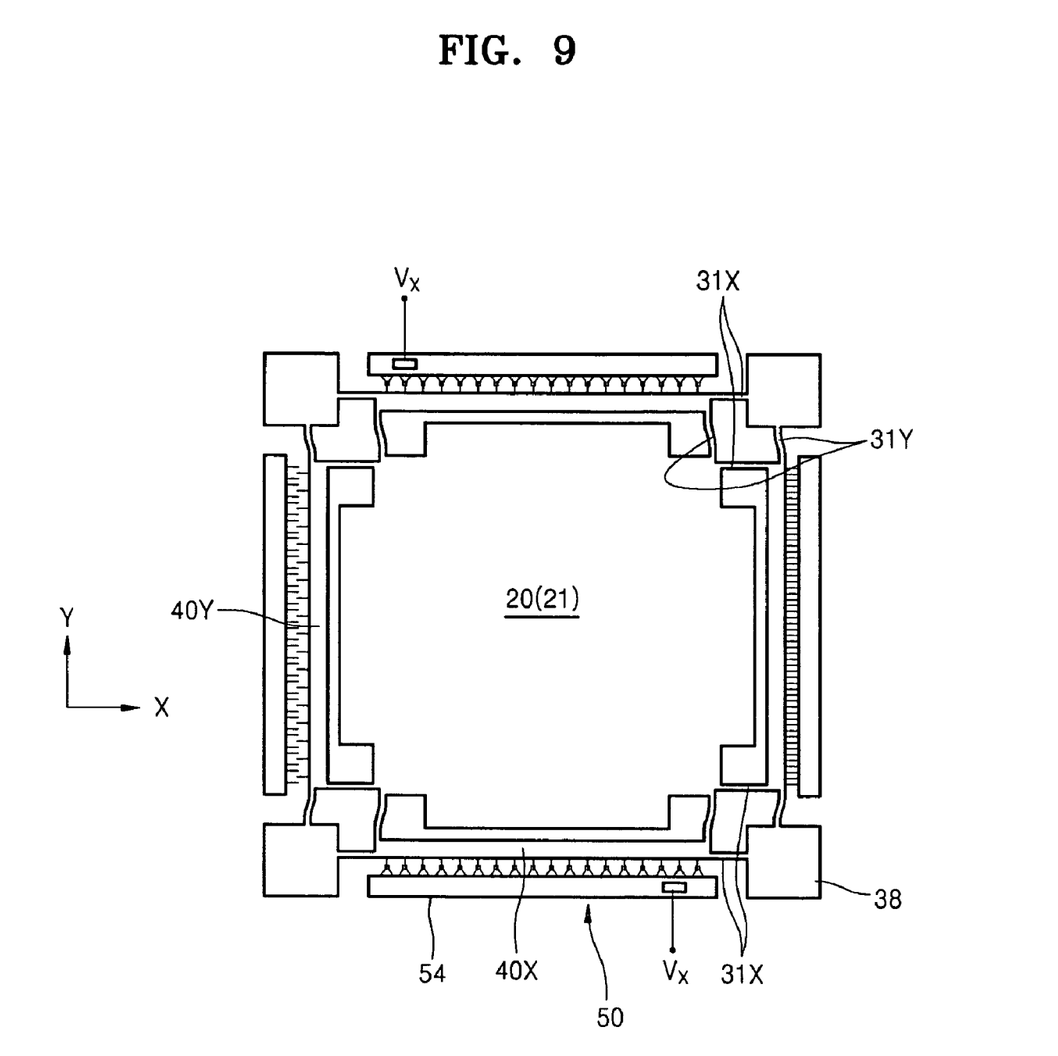

FIGS. 8 and 9 are plan views for explaining an operation of the locking device 50 according to an exemplary embodiment of the present invention. When the X-Y stage 20 is driven in the x direction, first, a predetermined voltage Vx is applied to the second comb electrodes 52 formed in the x-direction portion 40x of the stiffeners 40. As depicted in FIG. 8, the pair of the second comb electrodes 52 contact the first comb electrode 51 due to the electrostatic force between the second comb electrodes 52 and the first comb electrodes 51. Accordingly, the first comb electrodes 51 are locked. When the first comb electrodes 51 are locked by the second comb electrodes 52, the x-direction portion 40x of the stiffener 40 is fixed.

Next, when a current is applied to the flat panel coils 81 that drive the X-Y stage 20 in the x direction, as depicted in FIG. 9, the X-Y stage 20 moves in the x direction. At this time, the y-direction portion 31y of the elastic beams 31 deforms in the x direction, and the y-direction portion 40y of the stiffeners 40 moves in the x direction together with the X-Y stage 20. On the other hand, the x-direction portion 40x of the stiffeners 40 does not move since it is fixed in the locking device 50, and accordingly, the X-Y stage 20 cannot move in the y direction. Thus, the X-Y stage 20 can be moved in a desired direction by controlling the direction and amount of current that flows in the flat panel coils 81, and at this time, data can be stored in the medium 21 or data can be read from the medium 21 using the probe array 90.

To move the X-Y stage 20 in the y direction, after the y-direction portion 40y of the stiffeners 40 is fixed by the locking device 50 and the x-direction portion 40x of the stiffeners 40 is released from the locking device 50, a current is applied to the flat panel coils 81, such that the x-direction portion 40x of the stiffener 40 moves in the y direction by deformation of the x-direction portion 31x of the elastic beams 31.

In accordance with the exemplary embodiments of the present invention, the X-Y stage can be precisely driven in a desired direction since the stiffeners are fixed by a locking device.

As described above, the X-Y stage driver having the locking device according to the exemplary embodiments of the present invention can be precisely driven since displacement of the X-Y stage in an unwanted direction is not allowed.

Also, the data storage system according to the exemplary embodiments of the present invention can precisely control the position of the X-Y stage. Therefore, high density data can be stored and read.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An X-Y stage driver having a locking device, the X-Y stage driver comprising:
   an X-Y stage;
   a supporting unit that supports the X-Y stage and comprises elastic beams that support corners of the X-Y stage;
   a driving unit that drives the X-Y stage in a first direction and a second direction which is perpendicular to the first direction;
   a stiffener that prevents the X-Y stage from rotating; and
   a locking device that fixes the stiffener by an electrostatic force.

2. The X-Y stage driver of claim 1, wherein the locking device comprises:
   a first anchor disposed to face a side surface of the stiffener;
   a plurality of first comb electrodes disposed on a surface of the stiffener facing the first anchor; and
   a plurality of second comb electrodes that are disposed on the first anchor and arranged in an alternating manner with the first comb electrodes.

3. The X-Y stage driver of claim 2, wherein pairs of the second comb electrodes are disposed on each of opposite sides of each of the first comb electrodes.

4. The X-Y stage driver of claim 3, wherein a width of each of the first comb electrodes is greater than a width of each of the second comb electrodes.

5. The X-Y stage driver of claim 2, wherein pairs of the first comb electrodes are disposed on each of opposite sides of the second comb electrodes.

6. The X-Y stage driver of claim 5, wherein a width of each of the second comb electrodes is greater than a width of each of the first comb electrodes.

7. The X-Y stage driver of claim 2, wherein the supporting unit further comprises a second anchor that supports the elastic beams and a base that contacts a lower surface of the second anchor, wherein the first anchor is formed on the base.

8. The X-Y stage driver of claim 1, wherein the driving unit comprises a plurality of coils formed on the X-Y stage and a plurality of permanent magnets that are disposed over and under the coils and form a magnetic field around the coils.

9. The X-Y stage driver of claim 1, wherein the stiffener comprises an x-direction portion and a y-direction portion that are provided along sides of the X-Y stage.

* * * * *